US012606499B2

(12) United States Patent
Cavalli et al.

(10) Patent No.: US 12,606,499 B2
(45) Date of Patent: Apr. 21, 2026

(54) METHOD FOR MAKING A PASSIVATING COATING BASED ON ONE OR MORE SILICON COMPOUNDS ON A CERAMIC MATRIX COMPOSITE REINFORCED WITH CARBON FIBRES AND CERAMIC MATRIX COMPOSITE REINFORCED WITH CARBON FIBRES WITH SUCH COATING

(71) Applicants:PETROCERAMICS S.P.A., Stezzano (IT); C.I.R.A. (CENTRO ITALIANO RICERCHE AEROSPAZIALI) S.C.P.A., Capua (IT)

(72) Inventors: Lorenzo Cavalli, Stezzano (IT); Massimiliano Valle, Stezzano (IT); Mario De Stefano Fumo, Capua (IT); Giuseppe Carmine Rufolo, Capua (IT); Roberto Gardi, Capua (IT); Stefania Cantoni, Capua (IT); Massimo Rosa, Capua (IT)

(73) Assignees: PETROCERAMICS S.P.A., Stezzano (IT); C.I.R.A. (CENTRO ITALIANO RICERCHE AEROPAZIALI) S.C.P.A., Capua (IT)

(*) Notice: Subject to any disclaimer, the term of this patent is extended or adjusted under 35 U.S.C. 154(b) by 1013 days.

(21) Appl. No.: 17/642,904

(22) PCT Filed: Sep. 16, 2020

(86) PCT No.: PCT/IB2020/058604
§ 371 (c)(1),
(2) Date: Mar. 14, 2022

(87) PCT Pub. No.: WO2021/053528
PCT Pub. Date: Mar. 25, 2021

(65) Prior Publication Data
US 2023/0002290 A1    Jan. 5, 2023

(30) Foreign Application Priority Data
Sep. 16, 2019    (IT) ........................ 102019000016382

(51) Int. Cl.
*C04B 41/87*        (2006.01)
*C04B 35/565*       (2006.01)
(Continued)

(52) U.S. Cl.
CPC .............. *C04B 41/87* (2013.01); *C04B 35/83* (2013.01); *C04B 41/4517* (2013.01);
(Continued)

(58) Field of Classification Search
None
See application file for complete search history.

(56) References Cited

U.S. PATENT DOCUMENTS

| 2013/0167374 A1 | 7/2013 | Kirby et al. |
| 2015/0274979 A1 | 10/2015 | Lazur |
| 2016/0229754 A1 | 8/2016 | Sheedy et al. |

FOREIGN PATENT DOCUMENTS

| CN | 1850730 A | 10/2006 |
| CN | 101503305 A | 8/2009 |

(Continued)

OTHER PUBLICATIONS

Office Action for Chinese Patent Application No. 2020800786662 mailed Aug. 19, 2022, 18 pages.
(Continued)

*Primary Examiner* — Ha S Nguyen
(74) *Attorney, Agent, or Firm* — Merchant & Gould P.C.

(57)        ABSTRACT

A method makes a silicon compound-based passivating coating on a ceramic matrix composite reinforced with carbon fibers. A piece made in a ceramic matrix composite reinforced with carbon fibers is placed in a closed chamber
(Continued)

of an oven. A predefined load of solid silicon is placed in the chamber avoiding direct contact between the silicon and the piece. The oven is heated while maintaining inside the chamber predefined medium/low vacuum conditions, to generate silicon vapors inside the chamber. The vapors react with substances on the surface of the piece to form a surface coating having composites of the substances with the silicon. The partial pressure of the vacuum, temperature inside the chamber and exposure times of the piece to the silicon vapors to obtain a predefined thickness of the surface coating are chosen. The piece is cooled once the predefined thickness of the passivating coating is reached.

15 Claims, 7 Drawing Sheets

(51) Int. Cl.

| | | |
|---|---|---|
| *C04B 35/80* | (2006.01) | |
| *C04B 35/83* | (2006.01) | |
| *C04B 41/00* | (2006.01) | |
| *C04B 41/45* | (2006.01) | |
| *C04B 41/50* | (2006.01) | |

(52) U.S. Cl.
CPC ...... *C04B 41/4529* (2013.01); *C04B 41/4558* (2013.01); *C04B 41/5059* (2013.01); *C04B*

*2235/428* (2013.01); *C04B 2235/5248* (2013.01); *C04B 2235/6587* (2013.01)

(56) References Cited

FOREIGN PATENT DOCUMENTS

| | | | | | |
|---|---|---|---|---|---|
| CN | 101863683 | A | | 10/2010 | |
| CN | 104010992 | A | | 8/2014 | |
| CN | 108395279 | A | * | 8/2018 | ........... C04B 41/009 |
| CN | 109354506 | A | * | 2/2019 | ............. C04B 35/73 |
| EP | 3 046 893 | B1 | | 11/2018 | |
| GB | 1 417 134 | A | | 12/1975 | |
| JP | H09-255443 | A | | 9/1997 | |

OTHER PUBLICATIONS

International Search Report and Written Opinion of the International Searching Authority for International Patent Application No. PCT/IB2020/058604 mailed Dec. 14, 2020, 11 pages.

Italian Search Report for Italian Patent Application No. 102019000016382 mailed May 8, 2020, 2 pages.

Hu, C. et al., "Sandwich-structured C/C-SiC composites fabricated by electromagnetic-coupling chemical vapor infiltration", Scientific Reports, 7(1): 1-9 (Oct. 2017).

* cited by examiner

METHOD FOR MAKING A PASSIVATING COATING BASED ON ONE OR MORE SILICON COMPOUNDS ON A CERAMIC MATRIX COMPOSITE REINFORCED WITH CARBON FIBRES AND CERAMIC MATRIX COMPOSITE REINFORCED WITH CARBON FIBRES WITH SUCH COATING

This application is a National Stage Application of PCT/IB2020/058604, filed 16 Sep. 2020, which claims benefit of Ser. No. 102019000016382, filed 16 Sep. 2019 in Italy, and which applications are incorporated herein by reference. To the extent appropriate, a claim of priority is made to each of the above-disclosed applications.

FIELD OF APPLICATION

The present invention relates to a method for making a passivating coating based on one or more silicon compounds on a ceramic matrix composite (CMC) reinforced with carbon fibres and a ceramic matrix composite reinforced with carbon fibres with such coating.

BACKGROUND ART

Ceramic matrix composites (CMC) are materials designed to combine the properties of polymer composites with the properties of ceramic materials. The properties of CMCs include:

high mechanical features (polymer composites and ceramic materials);
high fracture toughness (polymer composites);
lightness (polymer composites)
high hardness (ceramic materials)
high thermal stability (ceramic materials)
high resistance to oxidation (ceramic materials)

In the field of non-oxide materials, CMCs can be made with carbon fibres or with ceramic fibres, mainly in silicon carbide (SiC).

The CMCs made with SiC fibres have a high resistance to oxidation, but have very high costs and generally show medium-low mechanical features. The high costs are mainly due to the cost of the SiC fibres, about 2 orders of magnitude higher than the cost of carbon fibres. Furthermore, SiC fibre-based CMCs are usually densified with longer processes, which typically involve the formation of the SiC matrix from the vapour phase.

Carbon fibre-based CMCs have a lower oxidation resistance than SiC fibre-based CMCs. This aspect limits the maximum operating temperature in an oxidising environment.

A possible strategy to increase the operating temperature of carbon fibre-based CMCs is to apply protective coatings which reduce or completely prevent the contact of the material with the oxygen of the external environment.

The protective coatings may be applied with chemical vapour deposition (CVD) or physical vapour deposition (PVD) techniques.

In the case of chemical vapour deposition (CVD), a vapour is generated which reacts with the substrate or vapours which react with each other at close range with the substrate itself.

In the case of physical vapour deposition (PVD), the vapour of the substance to be deposited is generated directly. Therefore in PVD, unlike CVD, there is no reaction between substrate and coating.

The SiC is deposited by CVD methods starting from silicon precursor gases (e.g., silicon tetrachloride, silanes or TEOS) which react with the free carbon of the composite surface. In this case part of the substrate reacts but the coating appears substantially deposited on the surface of the CMC.

On the other hand, the PVD techniques for making SiC coatings involve evaporating silicon in an atmosphere rich in acetylene. Thereby an SiC gas is formed which is deposited on the substrate in full discontinuity therewith.

These two techniques allow to obtain dense, high-purity coatings which perform an excellent protective function against the oxidation of the CMC. However, they have a number of disadvantages which limit the use thereof:

need to work in ultra-high vacuum conditions; this requires the construction of expensive deposition chambers of limited size;
high cost of deposition plants;
need to manage high-danger gases, such as acetylene in the case of the PVD technique or chlorinated gases in the case of the CVD technique; the chlorinated gases which decompose during the growth of the coating generate residual gases rich in hydrochloric acid, which is aggressive towards metals and must be managed and disposed of correctly;
the typical deposition rates with the CVD and PVD techniques are around 1 µm per hour; making high-thickness coatings (of the order of tens of µm) requires long process times.

The aforesaid operating limits also entail limitations on the sizes of the pieces to be coated, which tend to be small, of the order of a few tens of centimetres.

In the reference sector there is therefore a very strong need to make coatings comprising silicon carbide on ceramic matrix composites reinforced with carbon fibres having the possibility of:

operating in no-high vacuum conditions, of the order of mbar;
operating in the absence of dangerous gases to manage;
using less expensive deposition plants with respect to those required to make coatings with the CVD or PVD techniques;
reducing process times due to higher deposition rates.

It should also be noted that the coatings obtained by means of the CVD or PVD techniques are associated with the substrate through a net interface (not graded), which defines a marked area of discontinuity. The presence of this discontinuity area favours the development of cracks and therefore the access of the external environment (oxidant) to the substrate.

It should also be noted that the CVD deposition technique does not generally allow to obtain coatings free of cracks.

The cracks are formed due to the different coefficient of thermal expansion CTE between the substrate and coating. SiC has a CTE of $4 \cdot 10^{-6}$ K-1, while a carbon fibre-based CMC has a CTE around $1 \cdot 10^{-6}$ K-1. The cracking of the coating therefore forms during cooling, and during the thermal cycles of use since the coating tends to expand and contract more than the substrate.

It is also known to insert a compatibilisation substrate between the coating and CMC in order to attenuate the mismatch between the coating CTE and CMC by means of a graded structure.

It is also known to use other types of protection against oxidation and temperature known as TBC (Thermal Barrier Coating) based on oxides, or as UHTCs (Ultra High Temperature Ceramics) based on borides, typically used for metal substrates. TBCs and UHTCs have even more deviated thermo-mechanical properties and have greater compatibility problems with the substrate. In this case, the need to use more than one interlayer between the substrate and coating is well known.

A crack-free coating could be obtained with the CVD technique if a very low thickness of the order of a few μm were applied. The reduced thickness could in fact allow the coating to deform, tolerating tensile stresses without fracturing. However, a reduced thickness would quickly be consumed in the presence of oxygen due to the establishment of passive oxidation mechanisms, which involve the oxidation of the SiC with the formation of $SiO_2$, and of active oxidation mechanisms with the formation of SiO.

Therefore, in the reference sector there is also an interest in making coatings based on one or more silicon compounds, in particular comprising silicon carbide, on ceramic matrix composites reinforced with carbon fibres which are as free of microcracks as possible and which have a gradual passage and therefore are more compatibilised with the composite substrate so as to better withstand thicknesses of the order of tens of microns.

PRESENTATION OF THE INVENTION

Therefore, the object of the present invention is to eliminate, or at least reduce, the aforementioned problems relating to the background art, by providing a method for making a passivating coating based on one or more silicon compounds, in particular comprising silicon carbide, on ceramic matrix composites reinforced with carbon fibres which gives the possibility of making the coating in non-high vacuum conditions and in the absence of dangerous gases to manage.

A further object of the present invention is to provide a method for making a passivating coating based on one or more silicon compounds on ceramic matrix composites reinforced with carbon fibres which can be implemented with less expensive plants than those required to make coatings with CVD or PVD techniques.

A further object of the present invention is to provide a method for making a passivating coating based on one or more silicon compounds on ceramic matrix composites reinforced with carbon fibres which allows to reduce the process times being the thickness of coating obtained equal.

A further object of the present invention is to provide a method for making a passivating coating based on one or more silicon compounds on ceramic matrix composites reinforced with carbon fibres which allows to make coatings which are more compatibilized with the composite substrate so that the substrate itself can better withstand coatings with thicknesses of the order of tens of microns.

A further object of the present invention is to provide a method for making a passivating coating based on one or more silicon compounds on ceramic matrix composites reinforced with carbon fibres which allows to reduce the formation of microcracks on the final coating.

DESCRIPTION OF THE DRAWINGS

The technical features of the invention may be clearly found in the contents of the claims presented below and the advantages thereof will become more apparent from the following detailed description, made with reference to the accompanying drawings, which show one or more embodiments thereof, given purely by way of non-limiting examples, in which:

DETAILED DESCRIPTION

Figure 1:
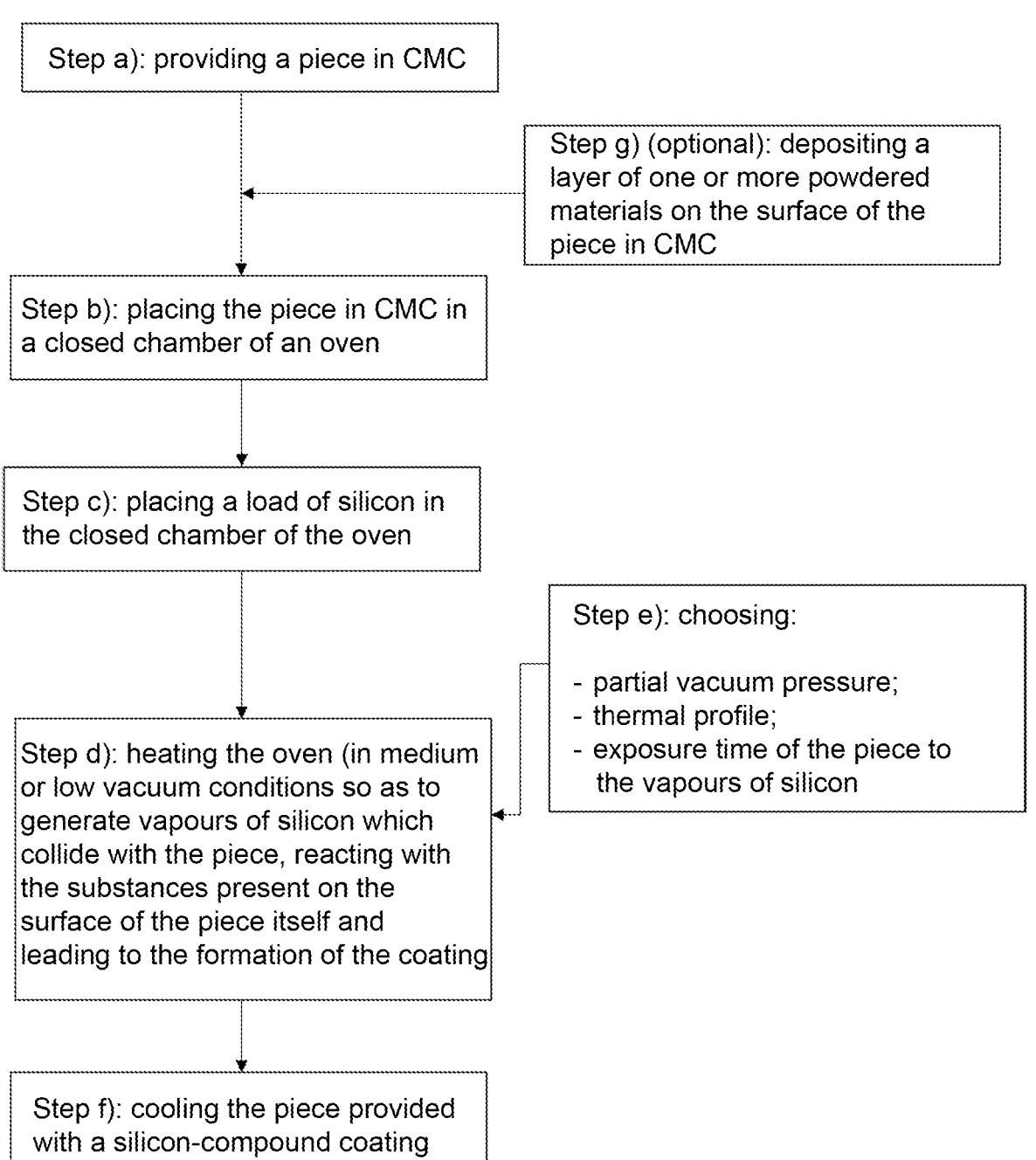
FIG. 1 shows a simplified flow diagram of the method for making a silicon-compound based passivating coating on a CMC in accordance with the present invention.

The present invention relates to a method for making a silicon compound-based passivating coating on a ceramic matrix composite reinforced with carbon fibres.

In accordance with a general form of implementation, the aforesaid method comprises the following operating steps:

a) providing at least one piece made in a ceramic matrix composite (CMC) reinforced with carbon fibres;

b) placing the piece to be coated in a closed chamber of an oven;

c) placing in the closed chamber a predefined load of solid silicon avoiding direct contact between the silicon and the piece to be coated;

d) heating the oven, maintaining inside the closed chamber predefined medium vacuum or low vacuum conditions, so as to generate from said silicon load vapours of silicon inside said closed chamber, which react with one or more substances present on the surface of said piece to be coated leading to the formation of a surface coating comprising composites of said one or more substances with the silicon.

As will be discussed below, the expression "substances present on the surface of the piece to be coated" is intended to include both substances which are incorporated into the piece itself and are exposed on the surface of the piece itself, and substances which are not incorporated into the piece itself, but which are deposited on the surface of such piece and are therefore exposed to the vapours of silicon.

The term "substances" is intended to include both simple elements, such as carbon (C) or metals, and compounds of simple elements, such as silicon carbide (SiC).

Preferably, the medium vacuum conditions are defined by a partial pressure between 5 mbar and 300 mbar, while the low vacuum conditions are defined by a partial pressure up to 0.1 mbar.

In accordance with said general form of implementation, the aforesaid method further comprises the following operating steps:

e) choosing the partial pressure of the vacuum, the maximum temperature inside said closed chamber and the exposure times of said piece to be coated to the vapours of silicon so as to obtain a predefined thickness of the surface coating on said piece; and f) cooling said piece once said predefined thickness of the passivating coating has been reached.

It has been possible to experimentally verify that the method according to the invention defines a fast and economical technique which allows to grow a passivating coating of silicon compounds (and in particular of silicon carbide SiC, as will be discussed below) on the surface of a carbon fibre-based CMC.

The cost-effectiveness of this technique derives essentially from the fact that:

it does not generate dangerous gases to manage; this excludes the need for expensive and complex management of such gases;

it operates in non-high vacuum conditions (medium vacuum or low vacuum).

The method according to the invention can therefore be implemented with less expensive deposition plants than those required to make coatings with the CVD or PVD techniques.

Unlike other coating techniques, the method according to the invention does not provide for the coating to grow on the surface of the piece by simple deposition of materials on the surface of the piece itself. The method according to the invention instead provides for the coating to grow on the surface of the piece also due to the addition of substances which are incorporated into the piece itself and are exposed on the surface. In other words, the coating grows from the material of the piece/substrate itself; this growth is generated by the reactions induced by the vapours of silicon and by the consequent addition of silicon on the surface of the piece to be coated.

This leads to a double effect:

the coating has a close adhesion with the piece itself (which acts as a substrate);

the growth of the coating removes from the surface of the piece itself substances which in the absence of the coating would be susceptible to oxidation reactions; therefore the growth of the coating not only has the effect of providing protection for the piece, but causes a chemical transformation of the piece itself (at least of the surface layers) with passivating effects of intrinsic protection from oxidative phenomena.

The method according to the invention also allows to obtain significant coating thicknesses (even of the order of 100 µm) in a short time compared to other techniques (times of the order of tens of hours, with respect to times of the order of hundreds of hours). It is also possible to choose a thermal and vacuum profile dedicated to the growth of the coating, as expressly provided in step e) of the method itself and as will be discussed later in the description.

Generally, on the surface of the piece to be coated made of a ceramic matrix composite (CMC) reinforced with carbon fibres, free carbon is present.

This free carbon can be constituted entirely or at least partly by carbon of the carbon reinforcement fibres of the ceramic matrix composite which the piece is made of.

Part of the free carbon present on the surface of the piece can also derive from the matrix which incorporates the carbon fibres. This carbon consists of residual carbon from the pyrolysed carbonaceous preform used to make the piece itself and which did not react with the molten silicon during the infiltration step which led to the formation of the ceramic matrix composite.

Advantageously, as will be resumed in the following description, the free carbon present on the surface of the piece can consist at least partly of carbon deposited on the surface of said piece before the aforesaid heating step d). In this case it is the carbon that does not belong to the piece to be coated, but has been added to the piece in particular to favour the kinetics of the reactions between the carbon and vapours of silicon, and therefore to stimulate the growth of the passivating coating.

Advantageously, during the heating step d) the vapours of silicon react in particular with the aforesaid free carbon forming silicon carbide as a silicon compound and thus leading to the formation of a passivating coating comprising silicon carbide.

The higher the free carbon content on the surface of the piece, the higher the silicon carbide content in the coating.

Figure 12:
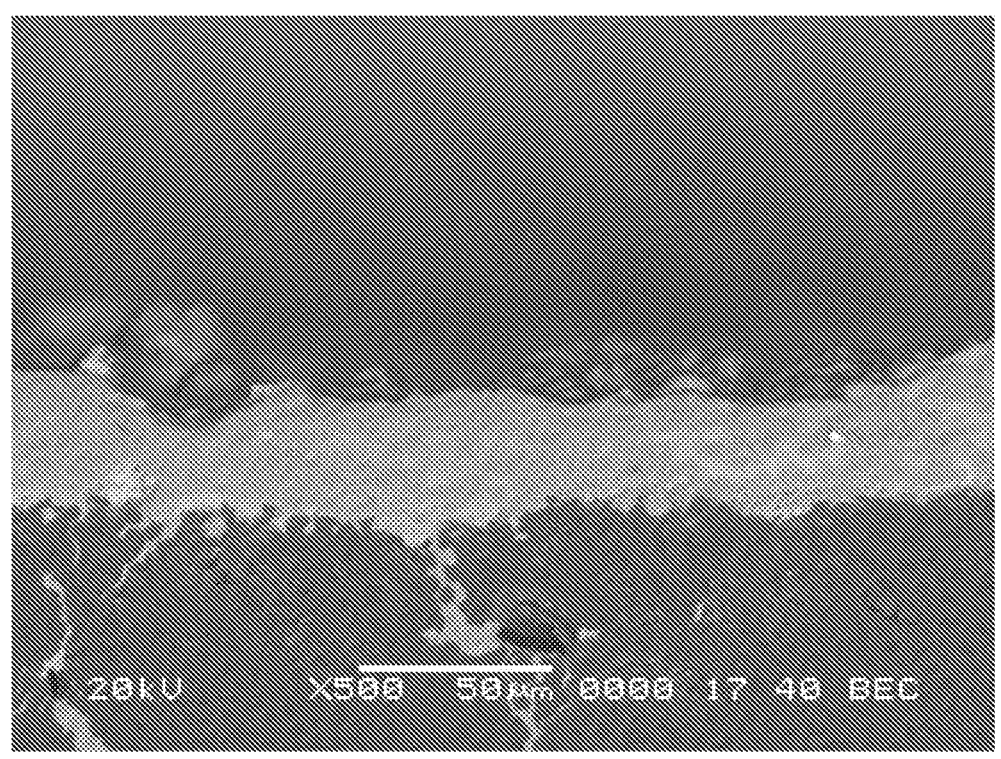
FIG. 12 shows a BES SEM image of a section of a coating comprising SiC obtained according to the invention, relating to the growth interface of the coating characterised by a dendritic structure.

Advantageously, as can be seen from the photograph presented in FIG. 12, the passivating coating comprising silicon carbide (light coloured layer) grows on the surface of said piece with a dendritic growth structure at the interface between the piece and the passivating coating. This dendritic structure allows and testifies to a close adhesion between the substrate (piece) and the passivating coating. The dark coloured layer above the passivating coating consists of the resin used to incorporate the sample so as to obtain the SEM scan.

More in detail, the dendritic growth structure is due to the diffusion penetration of the vapours of silicon inside the first surface layers of the substrate. This leads to the progressive growth of SiC structures which develop at the interface between the substrate and the passivating coating.

In accordance with a preferred embodiment of the invention, the method comprises a step g) of depositing on all or at least part of the surface of the piece to be coated a layer of powders of one or more materials suitable to react with the vapours of silicon and are chosen as a function of one or more predefined silicon compounds to be obtained in the passivating coating.

Operatively, this step g) is conducted before the aforesaid heating step d).

Advantageously, the powders of said one or more materials are deposited on the surface of the piece to be coated in the form of a slurry based on water, an organic solvent or a resin.

Operatively, the water, solvent or resin are then evaporated and/or cross-linked before placing the piece to be coated in the closed chamber of the oven.

Preferably, the aforesaid one or more materials are chosen from the group constituted by graphite, coke, carbonaceous material, silicon, crystalline or amorphous silica, transition metals, silicon carbide and/or other carbides.

In particular, the presence of graphite powders, coke or carbonaceous particles in the aforesaid layer of powders deposited on the surface of the piece can be provided so as to increase the free carbon present on the surface of the piece and thus favour the formation of silicon carbide during the heating step d) with exposure to the vapours of silicon.

In particular, the presence of silicon carbide powders in the aforesaid layer of powders deposited on the surface of the piece can be provided so that during the heating step d), with the exposure to the vapours of silicon, the silicon carbide powders become nucleation points for the crystallisation of silicon carbide on the surface of the piece.

In particular, the presence of silicon powders in the aforesaid layer of powders deposited on the surface of the piece can be provided so that during the heating step d), with the exposure to the vapours of silicon, the silicon powders liquefy, triggering formation reactions of silicon carbide in the liquid phase, which favour the formation of silicon carbide on the surface of the piece.

In particular, the presence of crystalline or amorphous silica powders in the aforesaid layer of powders deposited on the surface of the piece can be provided so that during the heating step d), with exposure to the vapours of silicon, the silica powders generate silicon oxide gas which reacts with the free carbon of the piece, forming silicon carbide crystals, the latter becoming nucleation points for the crystallisation of silicon carbide on the surface of the piece.

Advantageously, the aforesaid layer of powders can comprise powders of one or more transition metals. The inclusion of transition metal powders in the layer of powders which completely or partially covers the piece to be coated is aimed at the formation of silicides and/or carbo-silicides in the passivating coating as well. Operatively, during the heating step d) with exposure to the vapours of silicon, the aforesaid one or more transition metals can react with the silicon forming silicides and, in the presence of free carbon, forming mixed phases of silicides and carbon-silicides, so that said passivating coating also comprises silicides and/or carbon silicides.

Generally, the coatings of silicides and carbo-silicides, in particular of molybdenum, chromium, titanium, have good thermal stability. In particular, the silicides and carbo-silicides have excellent resistance to oxidation and good mechanical features at high temperatures. The presence of silicides and/or carbo-silicides in the passivating coating can therefore be an improvement with respect to silicon carbide SiC alone, which tends to oxidize to form $SiO_2$.

As already mentioned above, the heating step d) of the oven is carried out maintaining predefined medium vacuum or low vacuum conditions inside the closed chamber, so as to generate vapours of silicon from said silicon load inside the closed chamber.

Preferably, the heating step is carried out to generate vapours of silicon from the melting of the silicon load. However, the case in which the vapours of silicon are generated by sublimation of the silicon load is included as well.

Preferably, the aforesaid heating step d) is conducted in the presence of a partial nitrogen and/or inert gas pressure, so as to prevent pressures lower than the vapour tension of the silicon being reached inside the closed chamber of the oven and thus causing the vaporisation and sublimation of any silicon contained in said piece. The partial nitrogen and/or inert gas pressure is also inserted so as to reduce the wettability of the silicon with respect to the carbon and thereby limit the leakage of any silicon present inside said piece before the formation of said passivating coating.

Preferably, the heating step d) is carried out at temperatures higher than 1400° C., and in particular higher than 1,414° C. (silicon melting temperature) to obtain silicon vapour formation. However, this value depends on the vacuum level or partial pressure of an inert gas or nitrogen introduced into the closed chamber. In this system, nitrogen cannot be considered an inert gas since at temperatures above 1400° C. it reacts with the free silicon of the CMC and the silicon of the silicon load to form silicon nitride. Low partial nitrogen pressures (around a few mbar) can in any case be used in the method according to the present invention as they do not involve significant nitriding of the coating and of the substrate (piece to be coated).

Figure 13:
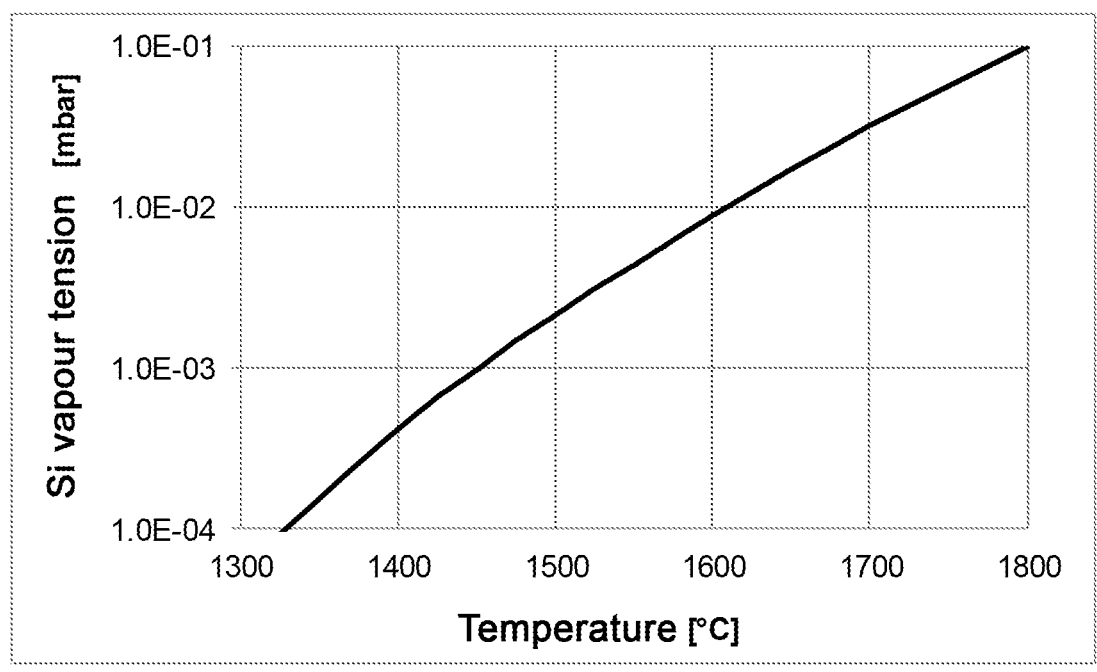
FIG. 13 shows the graph of the silicon vapour tension curve as a function of the temperature.

As previously highlighted, silicon melts at 1,414° C. and the vapour tension thereof increases significantly with the increasing temperature, as shown in the graph in FIG. 13. Once the maximum heating temperature has been set, it is not advisable to work at pressure values (vacuum) below the vapour tension of the silicon (represented by the curve shown in FIG. 13), if a CMC in which free silicon is present is to be coated. The free silicon inside the CMC would rapidly evaporate, generating voids in the substrate. Therefore, the insertion of partial pressures of nitrogen and inert gas (typically argon) has the purpose of preventing the silicon from undergoing evaporation.

Advantageously, as a function of the vacuum level (pressure inside the closed chamber), the heating step d) can be conducted so as to reach a maximum temperature inside the closed chamber of the oven within a wide temperature range preferably between 1,350° C. and 1,800° C., more preferably between 1,400° C. and 1,800° C., and even more preferably between 1,450° C. and 1,600° C.

Operatively, the operating parameters which govern the extent of the thickness of the final coating are:

the maximum heating temperature of the closed chamber;

exposure times of the piece to be coated to the vapours.

More in detail, it has been possible to experimentally verify that, by increasing the maximum heating temperature and the exposure times to the vapours, the final thickness of the passivating coating increases.

Preferably, the heating step d) comprises the following sub-steps:

d1) heating from room temperature up to a predefined maximum temperature;

d2) permanence at the maximum temperature; and d3) cooling from the maximum temperature to room temperature.

The vapours of silicon can also form during sub-steps d1) and d3) as a function of the temperature and pressure conditions. Therefore, although the formation of the passivating coating occurs mainly during sub-step d2), the coating can also grow during sub-steps d1) and d2).

Operatively, it has also been possible to experimentally verify that the extent of microcracks in the passivating coating is reduced if in particular the cooling sub-step d3) is conducted at a low thermal gradient, preferably not higher than 1° C./min.

Regardless of the thermal heating/cooling cycle, the passivating coating obtainable with the method according to the invention is less subject to microcracks than coatings obtained with traditional techniques due to the fact that it grows starting from materials belonging to the substrate with a dendritic structure and not by simple deposition which could lead to a clear distinction between coating and substrate.

Advantageously, the solid silicon load can consist of silicon in powder or in pieces.

In particular, the silicon load can be arranged in the closed chamber inside one or more crucibles.

The piece to be coated can be arranged in the closed chamber outside said one or more crucibles to avoid direct contact between liquid silicon and the piece to be coated.

Alternatively, the piece to be coated can be arranged above at least one of said crucibles with an interposed separator element made of a material substantially impermeable to liquid silicon, preferably BN, $Si_3N_4$, SiC, $B_4C$.

Some application examples of the method according to the invention are now presented.

Example 1

A CMC piece obtained by liquid silicon infiltration (LSI) of a long carbon fibre preform was coated by exposure to vapours of silicon in accordance with the method according to the present invention.

The volumetric ratios of the different components of the densified CMC are shown in Table 1 below.

TABLE 1

|  | Unit of measurement | LSI - CMC |
| --- | --- | --- |
| Density | g/cc | 2.05 |
| Open porosity | % | 2.4 |
| SiC content | Vol % | 24 |
| Si content | Vol % | 8 |
| C content | Vol % | 65 |

The CMC piece was placed in a carbon reinforced carbon fibre (CFC) crucible above a boron nitride plate with a hexagonal crystal structure. At the bottom of the crucible 1 kg of silicon powder with a particle size between 0.2 and 0.6 mm was inserted. The crucible was then subjected inside the closed chamber of an oven to a thermal cycle (heating step d) described in Table 2 below.

TABLE 2

| Step | T initial [° C.] | T final [° C.] | Heating Rate [° C./min] | Duration [min] | Atmosphere |
| --- | --- | --- | --- | --- | --- |
| 1 | 25 | 1375 | 4 | 338 | vacuum (0.1 mbar) |
| 2 | 1375 | 1600 | 1 | 225 | vacuum (0.1 mbar) |
| 3 | 1600 | 1600 | — | 120 | vacuum (0.1 mbar) |
| 4 | 1600 | 25 | −3 | 525 | vacuum (0.1 mbar) |

At the end of the thermal cycle, the CMC piece had a passivating silicon carbide (SiC) coating, having an average thickness of 80-100 µm. Overall, the thermal cycle (including the heating step and the cooling step) lasted 1,208 min (about 20 hours).

Figure 2:
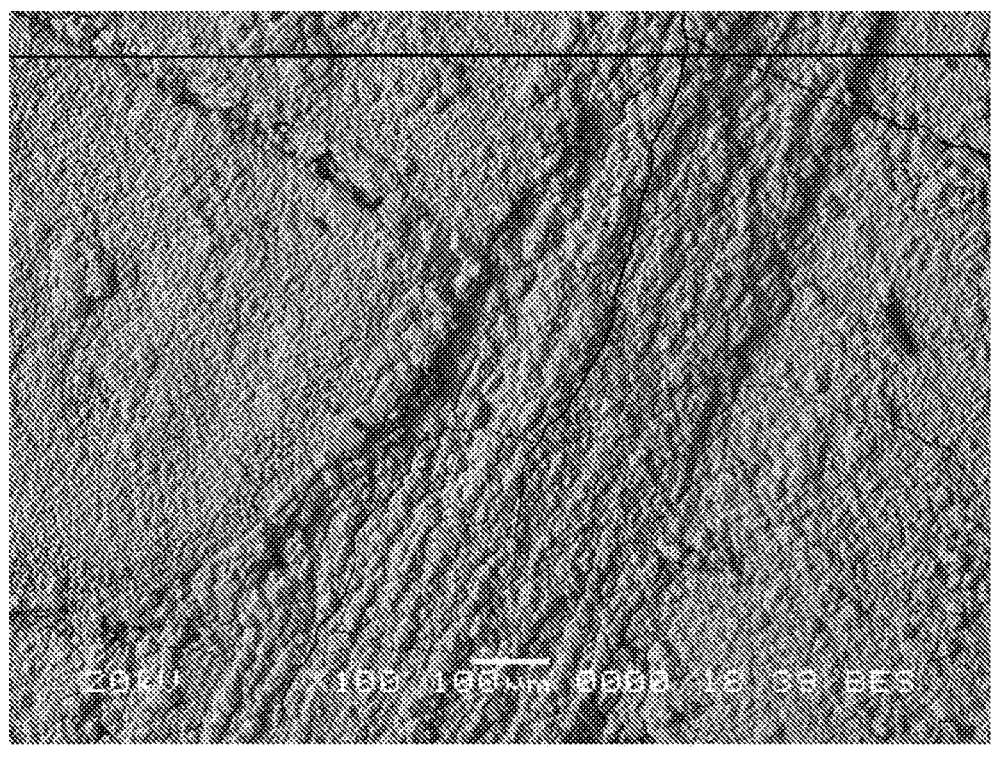
FIG. 2 shows a BES SEM image of the surface of a coating comprising SiC obtained on a CMC by the method of the present invention in accordance with example 1.

FIG. 2 shows an SEM image of the SiC coating collected from the backscattered electron signal.

Figure 3:
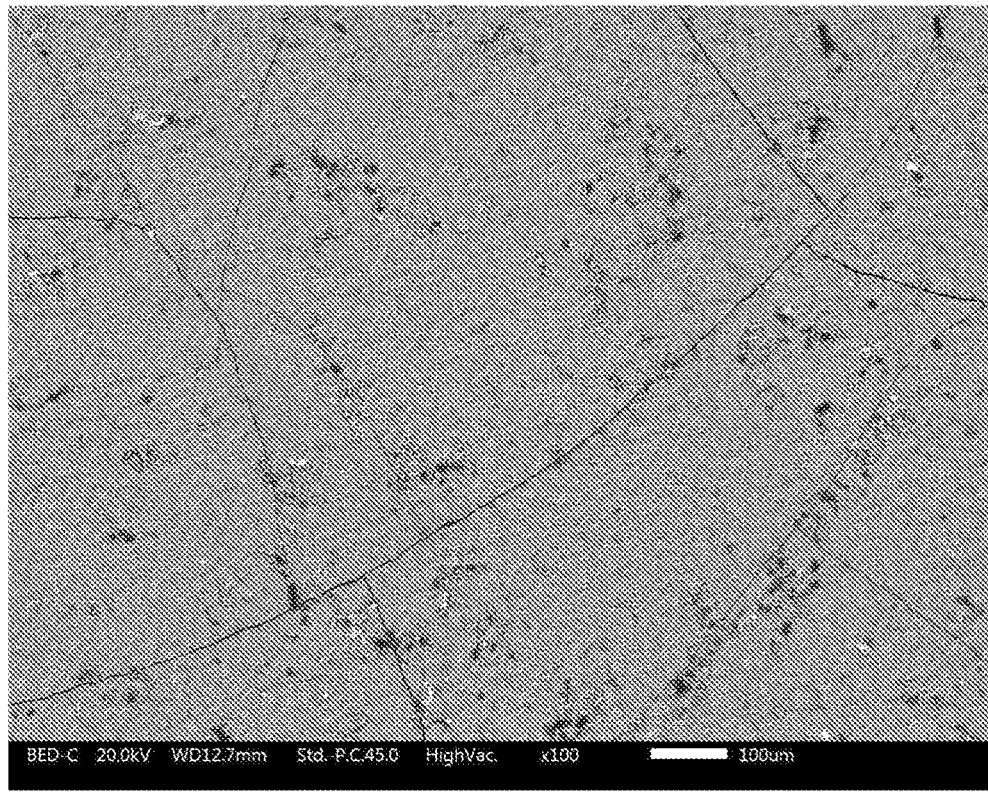
FIG. 3 shows an SEM image of the surface of an SiC coating obtained via CVD on the surface of a carbon fibre-based CMC.

The passivating coating covered the entire surface of the CMC; it was also found that there was no free carbon directly exposed to the external environment. A less marked microcrack (seen in FIG. 2) was observed compared to that present in a coating deposited with the CVD technique, an example of which is seen in the image of FIG. 3.

Example 2

Two CMC samples having the same composition as the CMC of example 1 (Table 1) were coated with two different water-based slurries, containing a vinyl glue (dispersion of polyvinyl acetate resins; commercial product Vinavil used). A first slurry contained silicon powders with D50 25 µm, while the second slurry contained SiC powders with D50 of 0.6 µm. The compositions of the two different slurries are shown in Table 3 below.

TABLE 3

| Slurry components | Slurry1 [wt %] | Slurry2 [wt %] |
| --- | --- | --- |
| water | 66.1 | 76.6 |
| Vinavil | 6.6 | 7.7 |
| silicon D50 25 µm | 27.2. |  |
| SiC D50 0.6 µm |  | 15.8 |
| Total | 100.0 | 100.0 |

The slurries were applied with a brush and left to dry in air at room temperature for 24 hours.

The two samples were placed in a crucible above boron nitride supports with a hexagonal crystal structure, as described in example 1. At the bottom of the crucible, 1 kg of powdered silicon with a particle size between 0.2 and 0.6 mm was introduced. The crucible was subjected to the same thermal cycle as in example 1 and described in Table 2.

It was observed that after thermal treatment (heating step d) the two CMC samples were covered with an SiC coating (passivating coating).

At the end of the thermal cycle, both CMC samples had a passivating silicon carbide (SiC) coating, having an average thickness of about 80-100 µm. Overall, the thermal cycle (including the heating step and the cooling step) lasted 1,208 min (about 20 hours).

Figure 4:
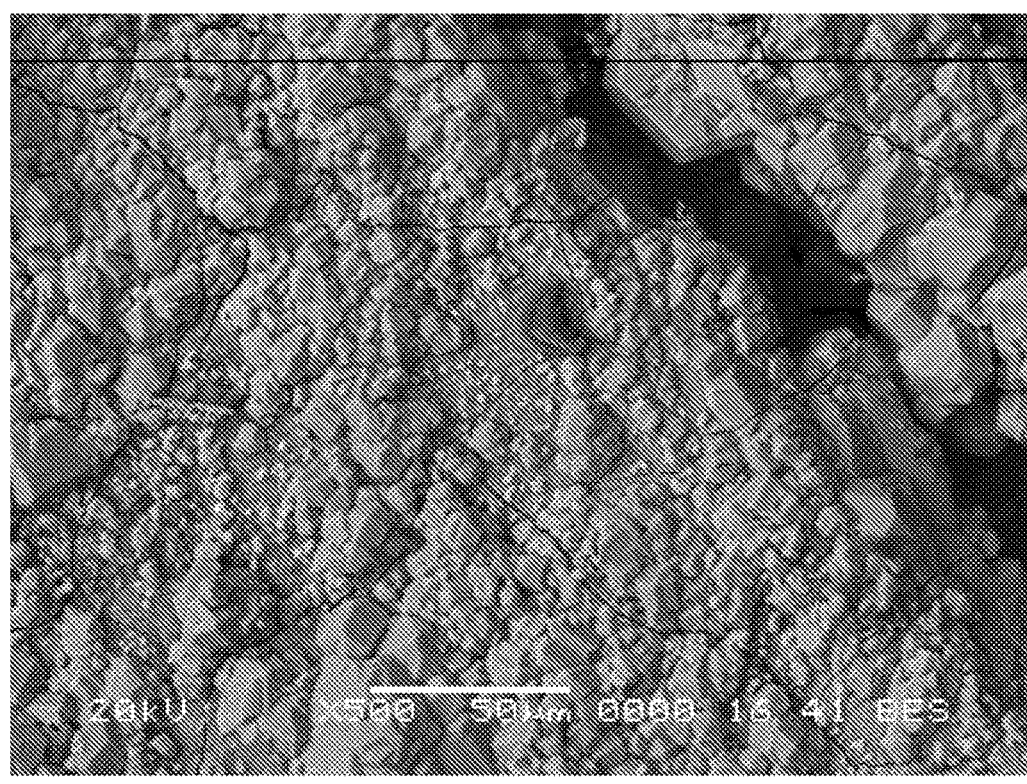
FIG. 4 shows a BES SEM image of a coating comprising SiC obtained on a CMC coated with a slurry comprising silicon, by the method of the present in accordance with example 2.
Figure 5:
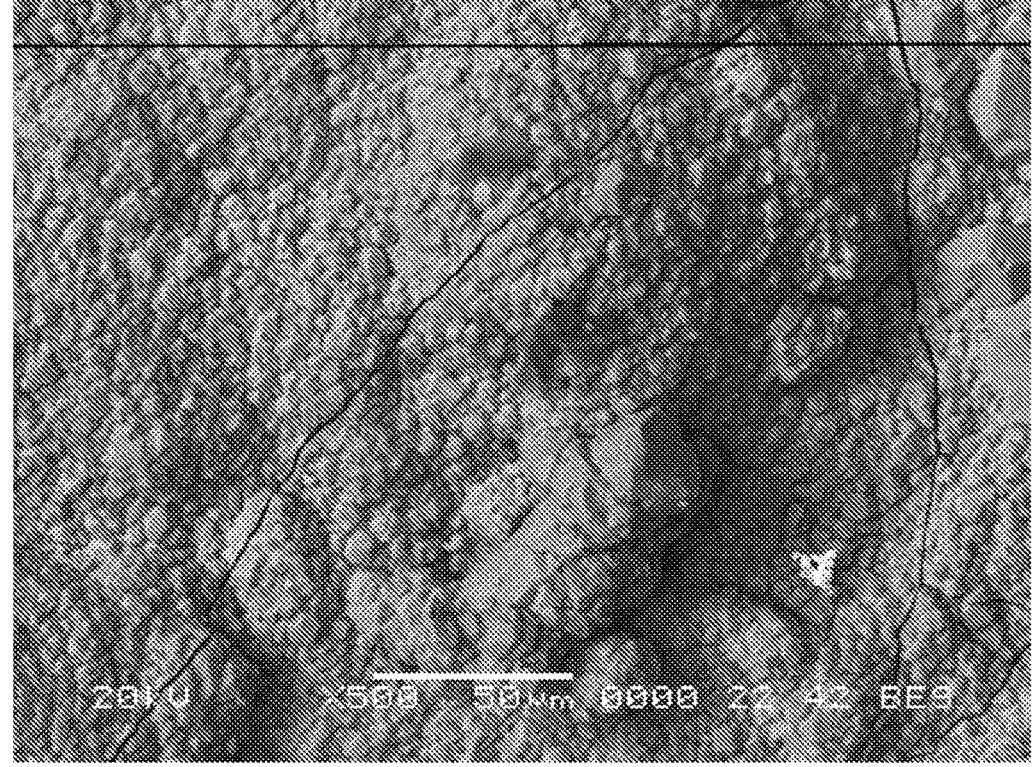
FIG. 5 shows a BES SEM image of a coating comprising SiC obtained on a CMC coated with a slurry comprising SiC, by the method of the present invention in accordance with example 2.

FIGS. 4 and 5 show SEM images collected from the surface of these two samples covered by the passivating coating according to the invention. More in detail, FIG. 4 shows a BES (Backscattered Electrons Signals) SEM image of the surface coated with a coating obtained with the silicon slurry (slurry 1). The coating completely covers the substrate but the morphology of the fibre tow texture remains visible. The coating has a micro-crack.

FIG. 5 shows a BES SEM image of the surface coated with a coating obtained with the SiC slurry (slurry 2). The coating completely covers the texture of the underlying CMC. A fairly significant crack is observed, more pronounced than that formed on the coating obtained with silicon powder (slurry 1).

As can be seen from the Figures indicated above, the coating obtained starting from silicon slurry completely covers the substrate, but the texture of the CMC correlated to the arrangement of the fibre tow remains visible. A very fine crack is also observed. The coating obtained by exposing a surface treated with SiC powder slurry to vapours of silicon also completely covers the texture of the substrate, but has a more pronounced crack.

Example 3

A large sample (35×25 cm approximately) in CMC consisting of long carbon fibres and Si/SiC matrix which has the same composition as example 1 and reported in Table 1 was coated with an SiC sub micrometric powder slurry. The composition of the slurry is the same based on SiC reported in example 2 (slurry 2 in Table 3).

The CMC was then subjected to a thermal cycle described in Table 4 below, which differs from the cycle used in the preceding examples for the insertion of a partial pressure of nitrogen before and during the exposure to the vapours of silicon. Nitrogen was used in particular to inhibit the boiling of the free silicon inside the CMC, as described previously.

TABLE 4

| Step | T initial [° C.] | T final [° C.] | Heating Rate [° C./min] | Duration [min] | Atmosphere |
|------|------------------|----------------|-------------------------|----------------|------------|
| 1 | 25 | 1375 | 4 | 337.5 | vacuum (0.1 mbar) |
| 2 | 1375 | 1600 | 1 | 225 | Partial pressure N2 (5-10 mbar) |
| 3 | 1600 | 1600 | — | 120 | Partial pressure N2 (5-10 mbar) |
| 4 | 1600 | 1375 | −3 | 75 | vacuum (0.1 mbar) |
| 5 | 1375 | 25 | −3 | 450 | vacuum (0.1 mbar) |

At the end of the thermal cycle, the CMC piece had a passivating silicon carbide (SiC) coating, having an average thickness of 100 µm. Overall, the thermal cycle (including the heating step and the cooling step) lasted 1,208 min (about 20 hours).

The sample was subjected to plasma wind tunnel (PWT) tests. The energy flow of the test was 345 KW/m2 and was applied to the sample surface for 600 seconds. The surface temperature of the CMC stabilised at about 1280° C. after a few tens of seconds.

Figure 6:
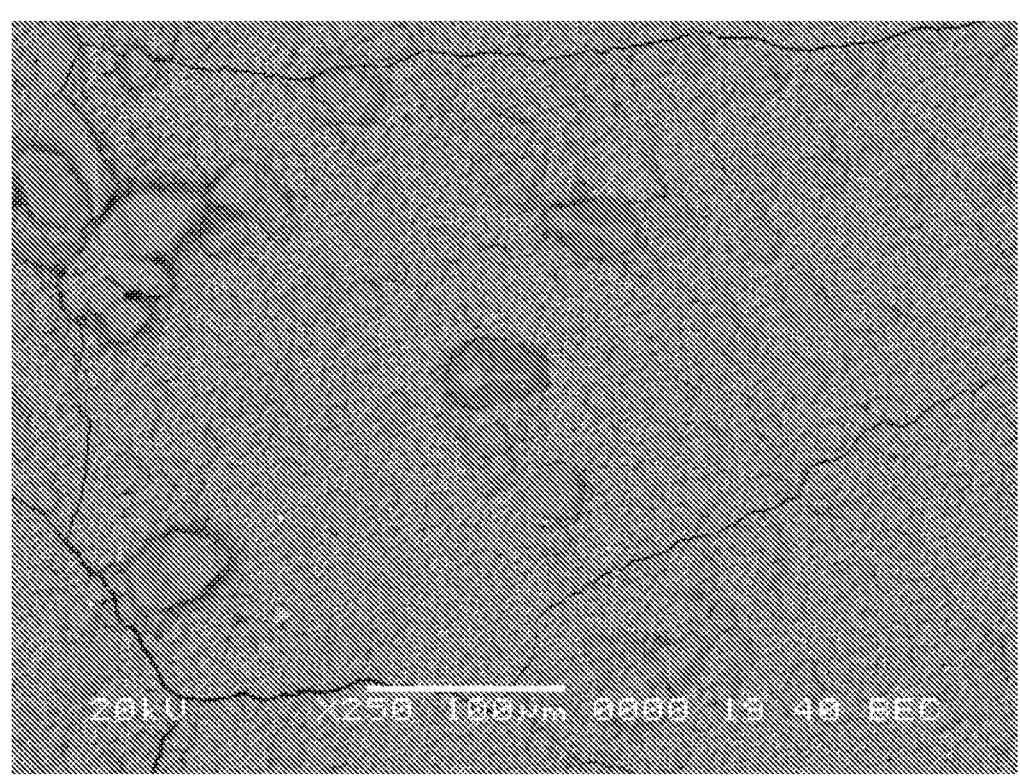
FIG. 6 shows a BES SEM image of the surface of a coating obtained in accordance with the invention according to what is provided in example 3.

After testing, no detachment of the coating was observed and the entire sample showed no detectable weight loss. FIG. 6 shows an SEM image of the surface of the coating before the PWT test, while FIGS. 7 and 8 show two SEM images of the surface and section of the coating respectively after the PWT test.

Figure 7:
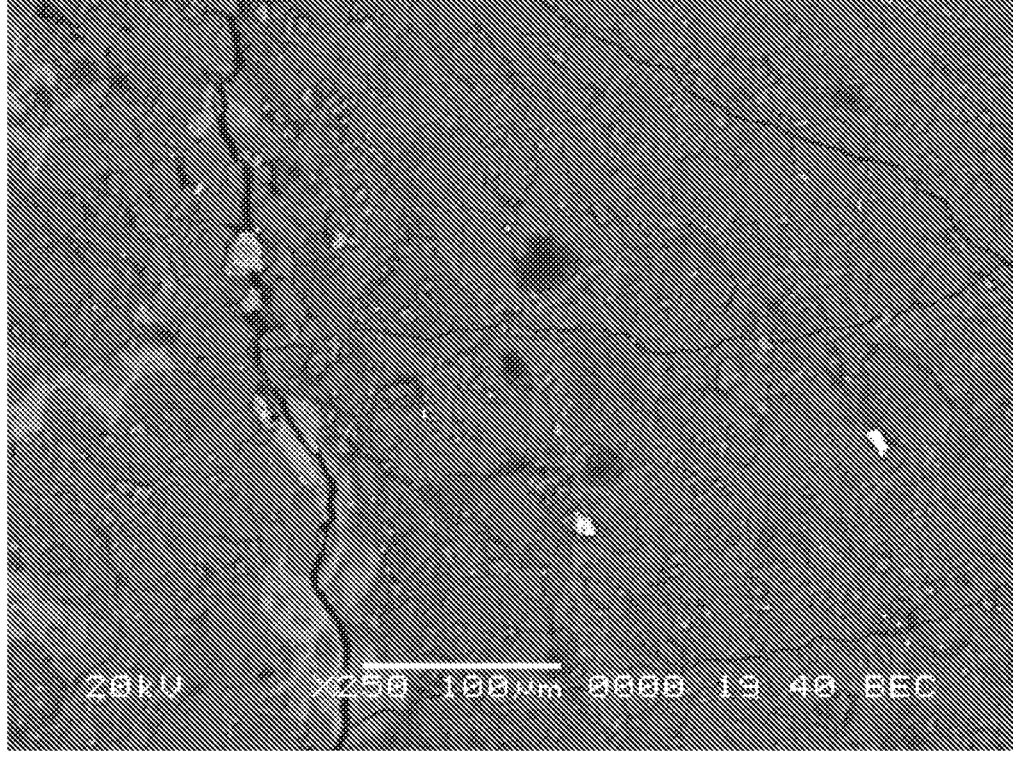
FIG. 7 shows a BES SEM image of the surface of the coating of FIG. 6 after having been subjected to a PWT test.
Figure 8:
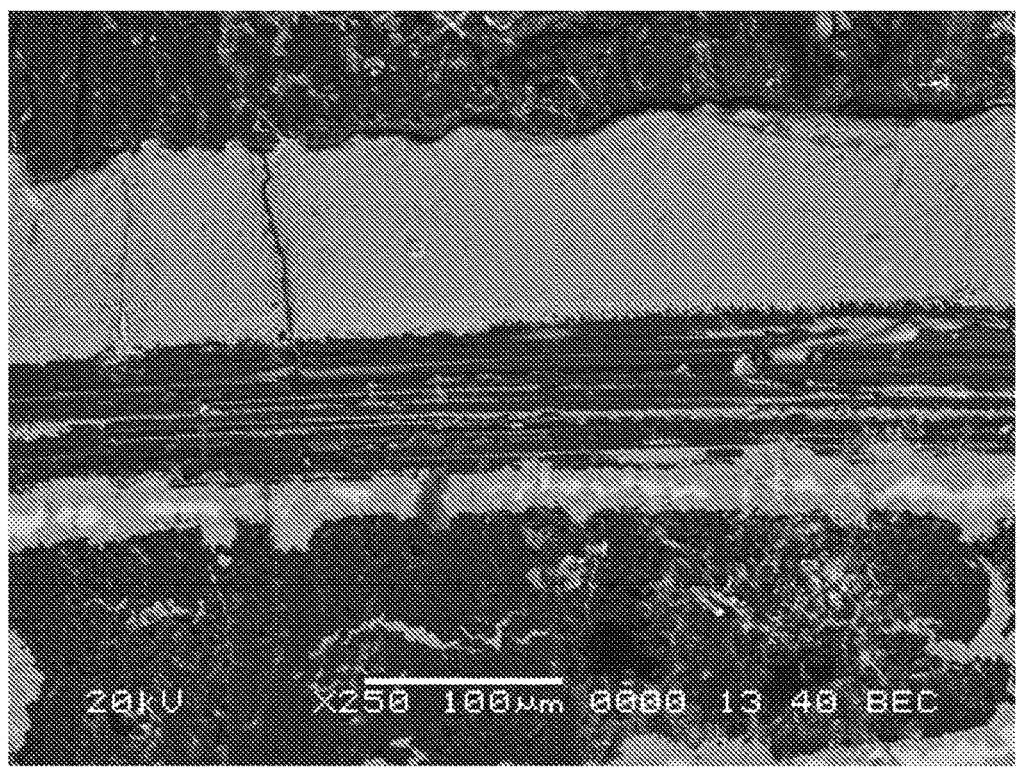
FIG. 8 shows a BES SEM image of a section of the coating of FIG. 7.

In FIG. 7 (surface after PWT treatment) a microcrack can be detected. The extent of the microcracking of the coating after the PWT test is similar to that observed immediately after the formation of the coating and before the PWT test.

Prior to the PWT test, no free carbon directly exposed to the outer surface was observed. No detectable deterioration due to oxygen exposure was observed after the PWT test.

In some areas seen as lighter coloured areas in FIG. 7 (surface after PWT test), the presence of oxidised silicon was detected.

Example 4

Two CMC samples, obtained by liquid silicon infiltration (LSI) of a long carbon fibre preform and having the composition reported in Table 5, were coated, the first with the SiC powder slurry of example 2; the second with colloidal graphite applied by spray. The two samples were then exposed to vapours of silicon in the same thermal cycle, performed according to the parameters of Table 4 (example 3).

TABLE 5

| | Unit of measurement | LSI - CMC |
|---|---------------------|-----------|
| Density | g/cc | 1.94 |
| Open porosity | % | 3 |
| SiC content | Vol % | 19 |
| Si content | Vol % | 8 |
| C content | Vol % | 70 |

At the end of the thermal cycle, the CMC piece coated with slurry comprising SiC had a passivating silicon carbide (SiC) coating, having an average thickness of 30-40 µm.

Overall, the thermal cycle (including the heating step and the cooling step) lasted 1,208 min (about 20 hours).

At the end of the thermal cycle, the CMC piece coated with slurry comprising graphite had a passivating silicon carbide (SiC) coating, having an average thickness of 50-60 µm. Overall, the thermal cycle (including the heating step and the cooling step) lasted 1,208 min (about 20 hours).

Figure 9:
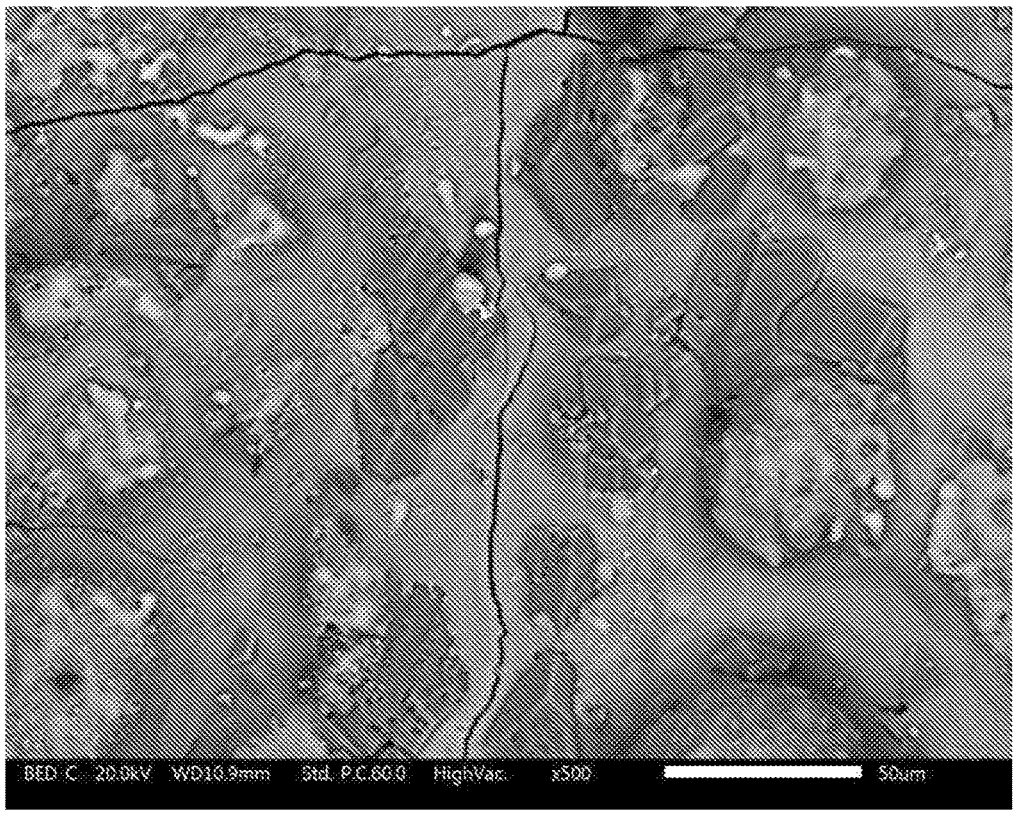
FIG. 9 shows a BES SEM image of the surface of a coating obtained according to the invention on a CMC coated with a slurry containing SiC in accordance with example 4.
Figure 10:
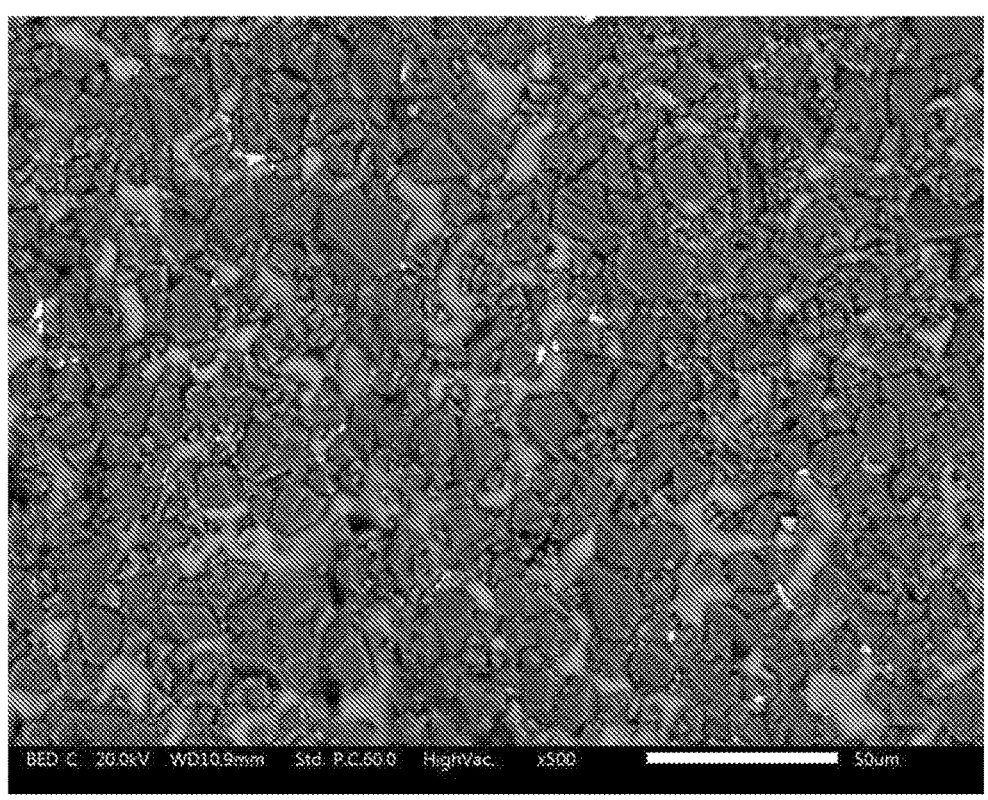
FIG. 10 shows a BES SEM image of the surface of a coating obtained according to the invention on a CMC coated with a slurry containing graphite in accordance with example 4.

FIG. 9 shows an SEM image of the surface of the coating obtained by covering the CMC with SiC powder slurry, while FIG. 10 shows an SEM image of the surface of the coating obtained by covering the CMC with graphite slurry.

It was observed that the exposure to vapours of silicon of the CMC sample having the composition reported in Table 5 and coated with SiC powder leads to the formation of a coating with a high content of free silicon. More in detail, in FIG. 9 in dark grey SiC microcrystals are observed embedded in a silicon coating (in light grey).

The use of a graphitic layer increases the surface free carbon and favours a greater presence of SiC. In fact, in FIG. 10 an excellent distribution of SiC microcrystals (in dark grey) can be observed, which are smaller than those detected in FIG. 9.

The CMC prepared with graphitic slurry was subjected to 6 PWT tests lasting 700 seconds each, for a total duration of 70 minutes. When fully operational, a temperature of 1250° C. was detected on the surface of the sample. Following the entire PWT test, the coating showed no signs of detachment and the CMC showed a minimal weight loss of 0.5%.

Example 5

A sample of CMC, obtained by liquid silicon infiltration (LSI) of a long carbon fibre preform and having the same composition as the CMC of example 4 and reported in Table 5, was coated with a water-based slurry having the composition shown in Table 6. The slurry contains a solid load of molybdenum powder with a grain size with D50 of 1.5 µm. The slurry was applied with a brush and allowed to air dry at room temperature for 24 hours.

TABLE 6

| Slurry components | Slurry3 [wt %] |
|-------------------|----------------|
| water | 85.5 |
| polyvinyl alcohol (PVA) | 2.6 |
| molybdenum D50 1.5 µm | 11.9 |
| Total | 100.0 |

The sample was placed in a crucible above boron nitride supports with a hexagonal crystal structure, as described in Example 1. At the bottom of the crucible, 1 kg of powdered silicon with a particle size between 0.2 and 0.6 mm was introduced. The crucible was subjected to the same thermal cycle as in example 3 and described in Table 4.

It was observed that after thermal treatment (heating step d) the CMC sample was covered with a coating having a mixed composition of silicon carbide (SiC) and molybdenum disilicide ($MoSi_2$) (passivating coating).

Figure 11:
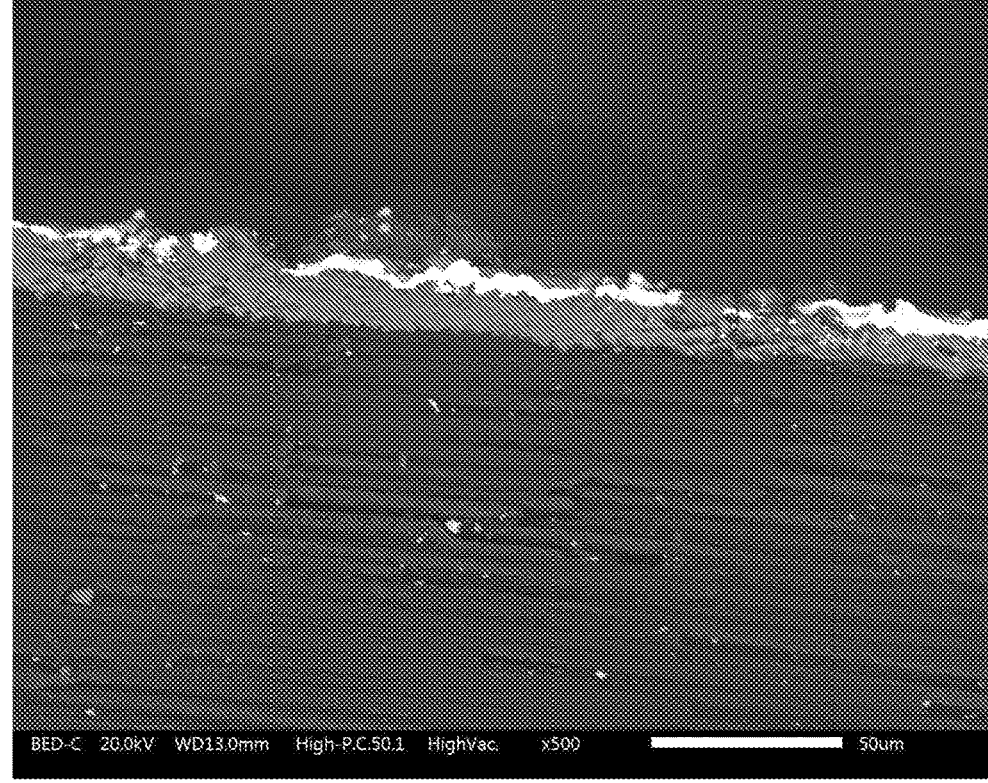
FIG. 11 shows a BES SEM image of the section of a coating obtained according to the invention on a CMC coated with a slurry containing molybdenum in accordance with example 5.

In FIG. 11 a bundle of CMC carbon fibres is observed at the bottom in black, a portion of a passivating coating in silicon carbide (SiC) with a thickness of 20-25 µm in grey, and a layer with a thickness of about 5-10 µm of molybdenum disilicide ($MoSi_2$) in white, adhered above the silicon carbide (SiC) layer.

At the end of the thermal cycle, the CMC sample had a passivating coating of silicon carbide (SiC) and molybdenum disilicide ($MoSi_2$), having an overall average thickness of about 20-30 μm.

The method according to the invention for making a passivating coating based on one or more silicon compounds, in particular comprising silicon carbide, on ceramic matrix composites reinforced with carbon fibres allows making coatings in non-high vacuum conditions and in the absence of dangerous gases to manage.

The method according to the invention can further be implemented with less expensive deposition plants than those required to make coatings with the CVD or PVD techniques.

The method according to the invention allows to reduce the process times with the same coating thickness obtained with respect to depositions by traditional techniques, and in particular CVD and PVD.

The method according to the invention allows to make passivating coatings based on one or more silicon compounds, and in particular based on SiC, on ceramic matrix composites reinforced with carbon fibres which are more compatibilized with the composite substrate than coatings of silicon compounds obtained with traditional techniques. The greater compatibilisation of the coating with the CMC substrate derives in particular from the fact that the coating grows starting from the substrate itself due to the reactions induced by the vapours of silicon, leading to a growth mode of the coating on the substrate characterised by dendritic structures. The latter allow a close adhesion between the substrate and coating. This allows the substrate itself to better withstand coatings with thicknesses of the order of tens of microns.

Therefore, the main advantages of the method according to the present invention are the following:

possibility of working in non-high vacuum conditions, of the order of mbar;

absence of dangerous gases to manage;

low cost of equipment if compared with that needed to make a CVD or PVD coating;

possibility of covering large pieces;

high deposition speed: in a few hours it is possible to obtain coatings with a thickness of the order of tens of μm.

obtaining passivating coatings which are more adherent to the substrate and therefore more compatibilized therewith.

In particular, the method according to the present invention is suitable for being applied to coat pieces in milled and/or ground CMC. In fact, the coating obtainable with the method according to the present invention integrates the exposed portions of the CMC after milling and/or grinding on the surface, without affecting the remaining ceramic structure of the piece.

The method according to the present invention also lends itself to being applied to coat a CMC component, which has undergone partial oxidation during the use thereof.

Therefore, the invention, thus conceived, achieves the preset objects.

Obviously, in the practical embodiment thereof, it may also take other shapes and configurations different from the one shown above, without thereby departing from the present scope of protection.

Moreover, all details may be replaced by technically equivalent elements, and any size, shape and material may be used according to the needs.

The invention claimed is:

1. Method for making a silicon compound-based passivating coating on a ceramic matrix composite reinforced with carbon fibres, said method comprising the following steps:

a) providing a piece to be coated comprising a ceramic matrix composite reinforced with carbon fibres, wherein the ceramic matrix composite reinforced with carbon fibres of the piece to be coated further comprises free silicon and free carbon;

b) placing said piece to be coated in a closed chamber of an oven;

c) placing in said closed chamber a predefined load of solid silicon avoiding direct contact between the solid silicon and said piece to be coated;

d) heating said oven, maintaining inside said chamber predefined medium vacuum conditions, with partial pressure from 5 mbar to 300 mbar, or low vacuum conditions, with partial pressure up to 0.1 mbar, so as to generate from said solid silicon load vapours of silicon inside said closed chamber, which react with one or more substances present on the surface of said piece leading to formation of a surface coating comprising composites of said one or more substances with the solid silicon, wherein said heating is conducted in the presence of a partial nitrogen and/or inert gas pressure, to prevent pressures lower than vapour tension of the free silicon being reached inside said closed chamber and causing vaporization or sublimation of any of the free silicon contained in said piece, and to reduce wettability of the free silicon with respect to the free carbon and thereby limit leakage of any free silicon present inside said piece before formation of said passivating coating;

e) choosing the partial pressure of the vacuum, temperature inside said closed chamber and exposure times of said piece to the vapours of silicon so as to obtain a predefined thickness of the surface coating on said piece; and f) cooling said piece once said predefined thickness of the passivating coating has been reached.

2. Method according to claim 1, wherein the free carbon is present on the surface of said piece and wherein during said heating step d) said vapours of silicon react with said free carbon forming silicon carbide as a silicon compound thus leading to the formation of a passivating coating comprising silicon carbide.

3. Method according to claim 2, wherein the free carbon comprises entirely or at least partly by carbon of the carbon reinforcement fibres of the ceramic matrix composite which the piece is made of.

4. Method according to claim 2, wherein the free carbon comprises at least partly carbon deposited on the surface of said piece before said heating step d).

5. Method according to claim 2 wherein said passivating coating comprising silicon carbide grows on the surface of said piece with a dendritic growth structure at an interface between the piece and the passivating coating.

6. Method according to claim 1, comprising a step g) of depositing on all or at least part of the surface of said piece a layer of powders of one or more materials to react with the vapours of silicon and chosen as a function of one or more desired predefined silicon compounds to be obtained in the passivating coating, said step g) being conducted before said heating step d).

7. Method according to claim 6, wherein said one or more materials are chosen from the group consisting of: graphite, coke, carbonaceous material, silicon, crystalline or amorphous silica, transition metals, silicon carbide and/or other carbides.

8. Method according to claim 6, wherein the powders of said one or more materials are deposited on the surface of said piece in the form of a slurry based on water, on an organic solvent or on a resin and in which the water, said solvent or said resin are made to evaporate and/or cross-link before placing said piece in said closed chamber.

9. Method according to claim 6, wherein said layer of powders comprises powders of one or more transition metals so that during said heating step with exposure to vapours of silicon said one or more transition metals react with the silicon forming silicides and, in the presence of free carbon, forming mixed phases of silicides and carbon-silicides, so that said passivating coating also comprises silicides and/or carbon silicides.

10. Method according to claim 1, wherein during the heating step d) the piece to be coated is kept at a maximum temperature between 1,350° C. and 1,800° C.

11. Method according to claim 10, wherein the time interval of permanence at the maximum temperature and the maximum temperature are chosen as a function of a desired final thickness of the passivating coating to be obtained on the piece to be coated.

12. Method according to claim 1, wherein said load of solid silicon comprises silicon in powder or in pieces arranged in said closed chamber inside one or more crucibles and wherein said piece to be coated is arranged in said closed chamber outside said one or more crucibles to prevent direct contact between liquid silicon and the piece to be coated.

13. Method according to claim 1, wherein said load of solid silicon comprises silicon in powder or in pieces arranged in said closed chamber inside one or more crucibles and wherein said piece to be coated is arranged above at least one of said crucibles with a separator element placed between said crucibles made of a material substantially impermeable to liquid silicon.

14. A ceramic matrix composite reinforced with carbon fibres comprising a silicon compound-based passivating coating formed on a composite substrate comprising a ceramic matrix composite reinforced with carbon fibres, wherein the ceramic matrix composite reinforced with carbon fibres further comprises free silicon and free carbon;

wherein said passivating coating comprises a dendritic growth structure in an interface area with the composite substrate.

15. A ceramic matrix composite reinforced with carbon fibres comprising a silicon compound-based passivating coating formed on a composite substrate comprising a ceramic matrix composite reinforced with carbon fibres, wherein the ceramic matrix composite reinforced with carbon fibres further comprises free silicon and free carbon;

wherein said passivating coating comprises a dendritic growth structure in an interface area with the composite substrate, wherein said coating is obtained using the method according to claim 1.

* * * * *